US010829638B2

(12) United States Patent
Jeol et al.

(10) Patent No.: US 10,829,638 B2
(45) Date of Patent: *Nov. 10, 2020

(54) COMPATIBILIZED POLYMER COMPOSITIONS

(71) Applicant: SOLVAY SPECIALTY POLYMERS USA, LLC, Alpharetta, GA (US)

(72) Inventors: Stéphane Jeol, Cumming, GA (US); Maryam Momtaz, Hamme-Mille (BE); Corinne Bushelman, Cumming, GA (US); Mohammad Jamal El-Hibri, Atlanta, GA (US)

(73) Assignee: SOLVAY SPECIALTY POLYMERS USA, LLC, Alpharette, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/096,627

(22) PCT Filed: Apr. 28, 2017

(86) PCT No.: PCT/EP2017/060223
§ 371 (c)(1),
(2) Date: Oct. 25, 2018

(87) PCT Pub. No.: WO2017/186926
PCT Pub. Date: Nov. 2, 2017

(65) Prior Publication Data
US 2019/0136057 A1 May 9, 2019

Related U.S. Application Data

(60) Provisional application No. 62/329,482, filed on Apr. 29, 2016.

(30) Foreign Application Priority Data

Sep. 8, 2016 (EP) .................... 16187796

(51) Int. Cl.
C08L 81/06 (2006.01)
C08L 81/04 (2006.01)
(Continued)

(52) U.S. Cl.
CPC .............. *C08L 81/06* (2013.01); *C08J 3/005* (2013.01); *C08K 3/26* (2013.01); *C08L 71/00* (2013.01);
(Continued)

(58) Field of Classification Search
CPC .......... C08L 81/06; C08L 81/04; C08L 79/08; C08L 71/12; C08L 2205/035;
(Continued)

(56) References Cited

U.S. PATENT DOCUMENTS 4,690,972 A * 9/1987 Johnson ............. C08G 75/0277
524/609
4,968,758 A 11/1990 Matzner et al.
(Continued)

FOREIGN PATENT DOCUMENTS

DE 3843438 A1 6/1990
EP 125816 A2 11/1984
(Continued)

*Primary Examiner* — Shane Fang
(74) *Attorney, Agent, or Firm* — Beatrice C. Ortego

(57) ABSTRACT

A polymer composition includes at least two different polymers independently selected from a poly(aryl ether ketone) (PAEK), a poly(aryl ether sulfone) (PAES), a polyarylene sulfide (PAS) and a polyetherimide (PEI), and about 0.05 to about 2 wt. % of at least one alkali metal carbonate. Preferably, the polymer composition is free or substantially free of solvent. A method includes melt mixing at least two different polymers independently selected from a poly(aryl ether ketone) (PAEK), a poly(aryl ether sulfone) (PAES), a polyarylene sulfide (PAS) and a polyetherimide (PEI), and
(Continued)

about 0.05 to about 2 wt. % of at least one alkali metal carbonate to form a compatibilized polymer composition.

17 Claims, 3 Drawing Sheets

(51) Int. Cl.
    *C08L 79/08*     (2006.01)
    *C08L 71/12*     (2006.01)
    *C08J 3/00*     (2006.01)
    *C08K 3/26*     (2006.01)
    *C08L 71/00*     (2006.01)

(52) U.S. Cl.
    CPC .............. *C08L 71/12* (2013.01); *C08L 79/08* (2013.01); *C08L 81/04* (2013.01); *C08J 2371/00* (2013.01); *C08J 2379/08* (2013.01); *C08J 2381/04* (2013.01); *C08J 2381/06* (2013.01); *C08J 2481/04* (2013.01); *C08K 2003/262* (2013.01); *C08L 2205/035* (2013.01); *C08L 2205/08* (2013.01)

(58) Field of Classification Search
    CPC ........ C08L 2205/08; C08J 3/005; C08K 3/26; C08K 2003/262; C80K 3/26
    See application file for complete search history.

(56) References Cited

U.S. PATENT DOCUMENTS

| 5,049,446 | A | * | 9/1991 | Blackwell | ................ | C08K 7/02 |
|---|---|---|---|---|---|---|
| | | | | | | 428/299.4 |
| 5,723,525 | A | | 3/1998 | Elbl-Weiser | | |
| 2009/0326153 | A1 | * | 12/2009 | Hiroi | ........................ | C08J 3/226 |
| | | | | | | 525/196 |
| 2011/0269879 | A1 | | 11/2011 | Kim et al. | | |

FOREIGN PATENT DOCUMENTS

| EP | 176988 A1 | 4/1986 |
|---|---|---|
| EP | 266791 A2 | 5/1988 |
| EP | 635548 A1 | 1/1995 |
| EP | 1997852 A1 | 12/2008 |
| WO | 8606389 A1 | 11/1986 |
| WO | 2008048266 A1 | 4/2008 |
| WO | 2015059216 A1 | 4/2015 |

* cited by examiner

COMPATIBILIZED POLYMER COMPOSITIONS

RELATED APPLICATIONS

This application claims priority to U.S. provisional application No. 62/329,482—filed Apr. 29, 2016—and to European patent application No. 16187796.4—filed Sep. 8, 2016—, the whole content of each of these applications being incorporated herein by reference for all purposes.

FIELD OF THE INVENTION

The present invention relates to high-performance compatibilized polymer compositions.

BACKGROUND

Polymers may be blended to achieve new compositions with desirable properties; however, the vast majority of polymers are immiscible with each other. Attempts to blend polymers often results in heterogeneous multi-phase compositions when the polymers are immiscible with each other. Such compositions may exhibit several thermal transition temperatures (Tg, Tm), usually exhibit poor mechanical properties, and suffer from delamination and/or aesthetical defects.

Indeed, the mechanical properties and ease of processing of a particular blend depend on the degree of compatibility of the polymer components. The main polymer component is usually referred to as the continuous phase or matrix, whereas the minor polymer component is typically defined as the dispersed phase. The degree of compatibility can be characterized by the dimensions of the dispersed phase in the continuous phase and the level of adhesion between the matrix and the dispersed phase. Certain highly immiscible blends are impossible to extrude in normal operating conditions due to a high die swell and are therefore not commercially available. Accordingly, a need exists for new blends of polymers, and in particular, blends of immiscible polymers, having increased compatibility.

DETAILED DESCRIPTION OF PREFERRED EMBODIMENTS

Figure 1:
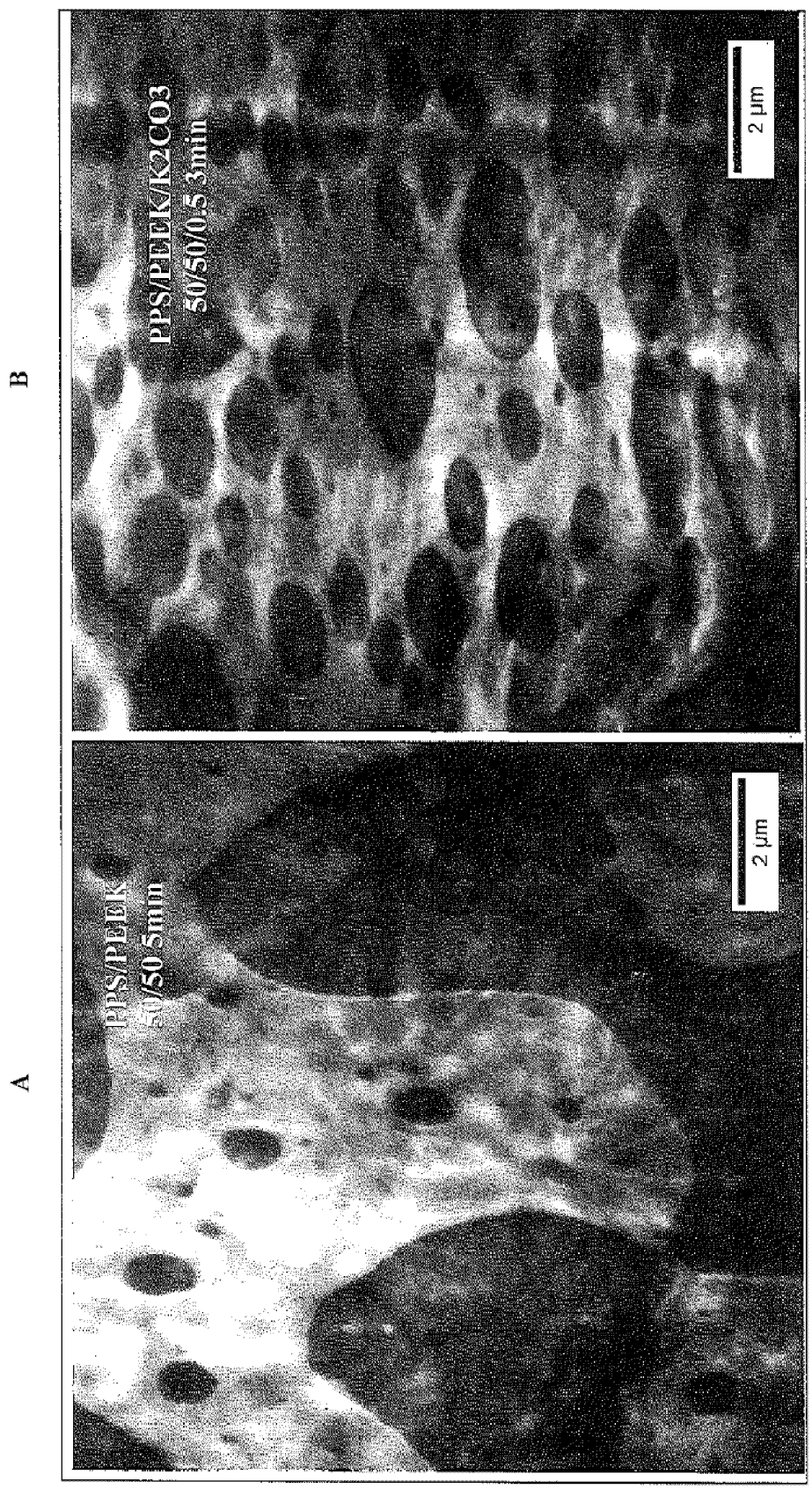
FIG. 1 shows transmission electron microscopy (TEM) scans of the compositions of Comparative Example 1 (FIG. 1A) and Example 1 (FIG. 1B).

Applicants have now surprisingly discovered that it is possible to prepare polymer blends with improved compatibility, including blends of highly immiscible polymers.

Exemplary embodiments are directed to a polymer composition including at least two different polymers, and about 0.05 to about 2 wt. % of at least one alkali metal carbonate.

The at least two different polymers are independently selected from the group consisting of a poly(aryl ether ketone) (PAEK), a poly(aryl ether sulfone) (PAES), a polyarylene sulfide (PAS) and a polyetherimide (PEI).

In some embodiments, the polymer composition is free of both (i) the combination of a poly(aryl ether ketone) (PAEK) and a poly(ether sulfone) (PES) and (ii) the combination of a poly(para-phenylene sulfide) (PPS) and a poly(aryl ether sulfone) (PAES).

In some embodiments, the polymer composition is substantially free of solvents, that-is-to-say that the composition does not comprise solvent and comprises solvent(s) in an amount not exceeding 2 wt. % (based on the total weight of the composition), for example less than 1 wt. %, less than 0.5 wt. % or less than 0.1 wt. %.

For the sake of clarity, throughout the present application:
the term "alkali metal carbonate" includes an alkali metal carbonate and any reagent from which the alkali metal carbonate can be derived in situ during processing at high temperature, for example alkali metal bicarbonate.
the term "solvent" means a liquid in which at least one of the polymers in the polymer composition will at least partially dissolve;
"substantially free of solvent" means less than 2 wt. % of solvent, for example less than 1 wt. %, less than 0.5 wt. % or less than 0.1 wt. %;
"substantially free of reactive polymers" means less than 2 wt. % of reactive polymers, based on the total weight of the polymers in the polymer composition;
"substantially simultaneously" means within 30 seconds;
the term "halogen" includes fluorine, chlorine, bromine, and iodine, unless indicated otherwise; and
the adjective "aromatic" denotes any mono- or polynuclear cyclic group (or moiety) having a number of π electrons equal to 4n+2, where n is 1 or any positive integer; an aromatic group (or moiety) can be an aryl and arylene group (or moiety).

In the present application:
any description, even though described in relation to a specific embodiment, is applicable to and interchangeable with other embodiments of the present disclosure;
where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and
any recitation herein of numerical ranges by endpoints includes all numbers subsumed within the recited ranges as well as the endpoints of the range and equivalents.

Any of the polymers described herein may be present in either a reactive form (i.e. a reactive polymer) or a non-reactive form.

In their reactive form, the polymers include at least 5, at least 10, at least 15, preferably at least 20, preferably at least 50 microequivalents per gram (μeq/g) of hydroxyl (—OH) or thiol (—SH) end groups. One example of such a reactive polymer is reactive poly(ether sulfone) (rPES), which is available from Solvay Specialty Polymers USA, LLC, as VIRANTAGE® PESU.

According to an embodiment, at least one of the at least two different polymers is in reactive form, preferably a reactive form including end groups selected from —OH and —SH in a concentration greater than 5 μeq/g of the reactive polymer.

In their non-reactive form, the polymers include one or more non-reactive end groups. The non-reactive end groups are preferably —Cl, —F, —CH$_3$, or —O—CH$_3$. Preferably the non-reactive polymers include at least 20, preferably more than 50 micro equivalents per gram of non-reactive end groups.

Preferably, the at least two different polymers are in a non-reactive form. In some embodiments, the polymer composition may include at least one reactive polymer in addition to the at least two different polymers. Preferably, the additional reactive polymer is a reactive form of one of the at least two different polymers.

Generally, the polymers in the polymer composition may have a weight average molecular weight (Mw) ranging from 10,000 g/mol to 150,000 g/mol, preferably from 20,000 g/mol to 100,000 g/mol, as determined by Gel Permeation Chromatography (GPC).

In some embodiments, the polymer composition includes three, four, or more different polymers selected from those described herein.

In some aspects, the polymer composition may be free or substantially free of reactive polymers, for example, free of rPES.

Poly(Aryl Ether Ketone)s (PAEK)

As used herein, a "poly(aryl ether ketone) (PAEK)" denotes any polymer comprising more than 50 mol % of recurring units ($R_{PAEK}$) comprising a Ar'—C(=O)—Ar* group, where Ar' and Ar*, equal to or different from each other, are aromatic groups. The recurring units ($R_{PAEK}$) are selected from the group consisting of units of formulae (J-A) to (J-D) below:

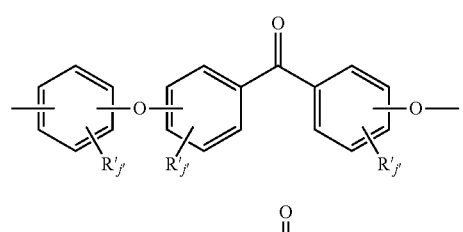

(J-A)

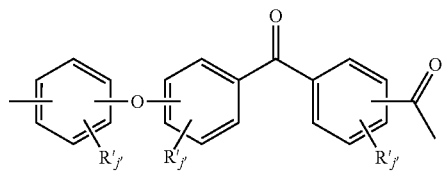

(J-B)

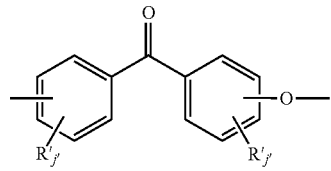

(J-C)

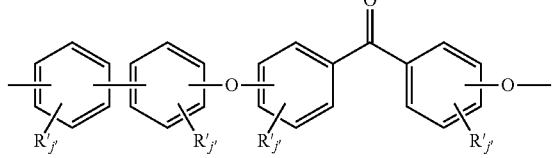

(J-D)

where:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j' is zero or an integer ranging from 1 to 4.

In recurring unit ($R_{PAEK}$), the respective phenylene moieties may independently have 1,2-, 1,4- or 1,3-linkages to the other moieties different from R' in the recurring unit ($R_{PAEK}$). Preferably, said phenylene moieties have 1,3- or 1,4-linkages, more preferably they have a 1,4-linkage.

In recurring units ($R_{PAEK}$), j' is preferably at each occurrence zero so that the phenylene moieties have no other substituents than those linking the main chain of the polymer.

In some embodiments, the PAEK is poly(ether ether ketone) (PEEK). As used herein, a "poly(ether ether ketone) (PEEK)" denotes any polymer of which more than 50 mol % of the recurring units ($R_{PAEK}$) are recurring units of formula J'-A:

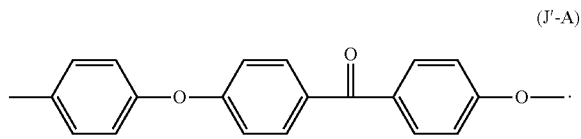

(J'-A)

Preferably at least 60 mol %, 70 mol %, 80 mol %, 90 mol %, 95 mol %, 99 mol %, and most preferably all of recurring units ($R_{PAEK}$) are recurring units (J'-A).

In another preferred embodiment, the PAEK is poly(ether ketone ketone) (PEKK). As used herein, a "poly(ether ketone ketone) (PEKK)" denotes any polymer of which more than 50 mol % of the recurring units ($R_{PAEK}$) are a combination of recurring units of formula J'-B and formula J''-B:

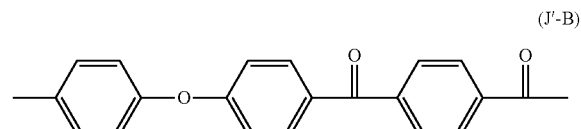

(J'-B)

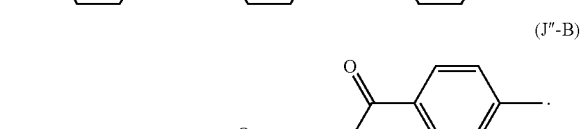

(J''-B)

Preferably at least 60 mol %, 70 mol %, 80 mol %, 90 mol %, 95 mol %, 99 mol %, and most preferably all of recurring units ($R_{PAEK}$) are a combination of recurring units (J'-B) and (J''-B).

In yet another preferred embodiment, the PAEK is poly(ether ketone) (PEK). As used herein, a "poly(ether ketone) (PEK)" denotes any polymer of which more than 50 mol % of the recurring units ($R_{PAEK}$) are recurring units of formula (J'-C):

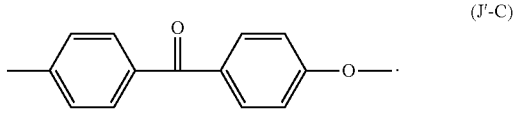
(J'-C)

Preferably at least 60 mol %, 70 mol %, 80 mol %, 90 mol %, 95 mol %, 99 mol %, and most preferably all of recurring units ($R_{PAEK}$) are recurring units (J'-C).

In some embodiments, the PAEK is a PEEK-PEDEK copolymer. As used herein, a "PEEK-PEDEK copolymer" denotes any polymer of which more than 50 mol % of the recurring units ($R_{PAEK}$) are both recurring units of formula J'-A (PEEK) and formula J'-D (poly(diphenyl ether ketone) (PEDEK)):

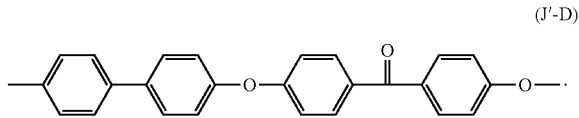
(J'-D)

The PEEK-PEDEK copolymer may include relative molar proportions of recurring units J'-A and J'-D (PEEK/PEDEK) ranging from 95/5 to 60/40. Preferably the sum of recurring units J'-A and J'-D represents at least 60 mol %, 70 mol %, 80 mol %, 90 mol %, 95 mol %, 99 mol %, of recurring units in the PAEK. In some aspects, recurring units J'-A and J'-D represent all of the recurring units in the PAEK.

Most preferably, the PAEK is PEEK. KETASPIRE® PEEK is commercially available from Solvay Specialty Polymers USA, LLC.

Poly(Aryl Ether Sulfone)s (PAES)

For the purpose of the present invention, a "poly(aryl ether sulfone) (PAES)" denotes any polymer of which at least 50 mol % of the recurring units are recurring units ($R_{PAES}$) of formula (K):

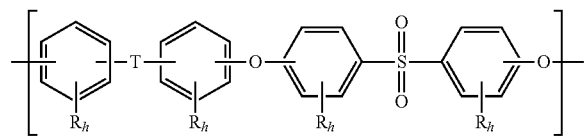
(K)

where:
(i) each R, equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;
(ii) each h, equal to or different from each other, is an integer ranging from 0 to 4; and
(iii) T is selected from the group consisting of a bond, a sulfone group [—S(=O)$_2$—], and a group —C($R_j$)($R_k$)—, where $R_j$ and $R_k$, equal to or different from each other, are selected from a hydrogen, a halogen, an alkyl, an alkenyl, an alkynyl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium. $R_j$ and $R_k$ are preferably methyl groups.

Preferably at least 60 mol %, 70 mol %, 80 mol %, 90 mol %, 95 mol %, 99 mol %, and most preferably all of recurring units in the PAES are recurring units ($R_{PAES}$).

In a preferred embodiment, the PAES is a polyphenylsulfone (PPSU). As used herein, a "polyphenylsulfone (PPSU)" denotes any polymer of which more than 50 mol % of the recurring units are recurring units of formula (K'-A):

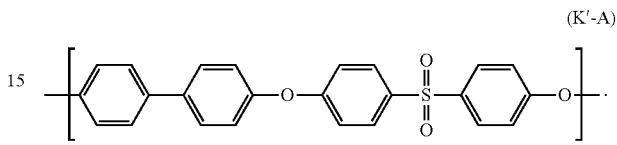
(K'-A)

Preferably at least 60 mol %, 70 mol %, 80 mol %, 90 mol %, 95 mol %, 99 mol %, and most preferably all of the recurring units in the PPSU are recurring units of formula (K'-A).

PPSU can be prepared by known methods and is notably available as RADEL® PPSU from Solvay Specialty Polymers USA, L.L.C.

In some embodiments, the PAES is a polyethersulfone (PES). As used herein, a "polyethersulfone (PES)" denotes any polymer of which at least 50 mol % of the recurring units are recurring units of formula (K'-B):

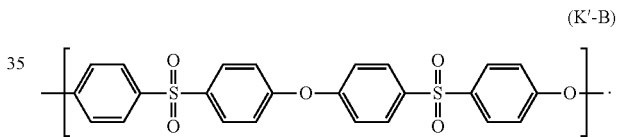
(K'-B)

Preferably at least 60 mol %, 70 mol %, 80 mol %, 90 mol %, 95 mol %, 99 mol %, and most preferably all of the recurring units in the PES are recurring units of formula (K'-B).

PES can be prepared by known methods and is notably available as VERADEL® PESU from Solvay Specialty Polymers USA, L.L.C.

In some embodiments, the PAES is a polysulfone (PSU). As used herein, a "polysulfone (PSU)" denotes any polymer of which at least 50 mol % of the recurring units are recurring units of formula (K'-C):

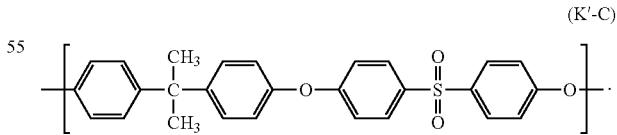
(K'-C)

Preferably at least 60 mol %, 70 mol %, 80 mol %, 90 mol %, 95 mol %, 99 mol %, and most preferably all of the recurring units in the PSU are recurring units of formula (K'-C).

PSU can be prepared by known methods and is available as UDEL® PSU from Solvay Specialty Polymers USA, L.L.C.

Excellent results were obtained when the PAES was selected from the group consisting of PPSU, PES, PSU, or a combination thereof.

Polyarylene Sulfide (PAS)

For the purpose of the present invention, the expression "polyarylene sulfide (PAS)" is intended to denote any polymer of which at least 50 mol % of the recurring units are recurring units ($R_{PAS}$) of formula —(Ar'—S)—, where Ar' is an aromatic group.

Preferably at least 60 mol %, 70 mol %, 80 mol %, 90 mol %, 95 mol %, 99 mol %, and most preferably all of the recurring units in the PAS are recurring units ($R_{PAS}$).

Nonlimiting examples of PAS include poly(2,4-toluene sulfide), poly(4,4'-biphenylene sulfide), poly(para-phenylene sulfide) (PPS), poly(ortho-phenylene sulfide), poly(meta-phenylene sulfide), poly(xylene sulfide), poly(ethylisopropylphenylene sulfide), poly(tetramethylphenylene sulfide), poly(butylcyclohexylphenylene sulfide), poly(hexyldodecylphenylene sulfide), poly(octadecylphenylene sulfide), poly(phenylphenylene sulfide), poly-(tolylphenylene sulfide), poly(benzylphenylene sulfide), poly[octyl-4-(3-methylcyclopentyl)phenylene sulfide], and any combination thereof.

Preferably, the PAS is poly(para-phenylene sulfide) (PPS). As used herein, a "poly(para-phenylene sulfide) (PPS)" denotes any polymer of which at least 50 mol % of the recurring units are recurring units ($R_{PPS}$) of formula (L):

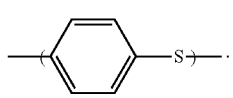

(L)

Preferably at least 60 mol %, 70 mol %, 80 mol %, 90 mol %, 95 mol %, 99 mol %, and most preferably all of the recurring units in the PPS are recurring units ($R_{PPS}$).

PPS is manufactured and sold under the trade name Ryton® PPS by Solvay Specialty Polymers USA, LLC.

Polyetherimide (PEI)

For the purpose of the present invention, a "polyetherimide (PEI)" denotes any polymer of which more than 50 mol % of the recurring units ($R_{PEI}$) comprise at least one aromatic ring, at least one imide group, as such and/or in its amic acid form, and at least one ether group. Preferably at least 60 mol %, 70 mol %, 80 mol %, 90 mol %, 95 mol %, 99 mol %, and most preferably all of recurring units of the PEI are recurring units ($R_{PEI}$).

Recurring units ($R_{PEI}$) may optionally further comprise at least one amide group which is not included in the amic acid form of an imide group.

The recurring units ($R_{PEI}$) are advantageously selected from the group consisting of following formulae (M), (N), (O), (P) and (Q), and mixtures thereof:

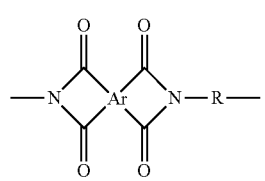

formula (M)

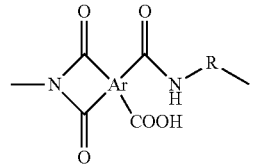

formula (N)

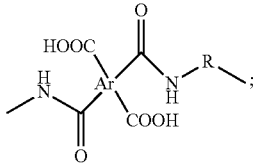

formula (O)

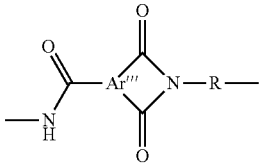

formula (P)

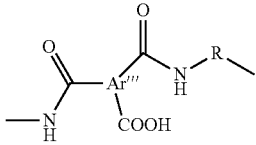

formula (Q)

where in formulae (M)-(Q):

Ar are tetravalent aromatic moieties and Ar''' are trivalent aromatic moieties independently selected from the group consisting of a substituted or unsubstituted, saturated, unsaturated or aromatic monocyclic and polycyclic group having 5 to 50 carbon atoms; and R is a divalent radical of the general formula (S):

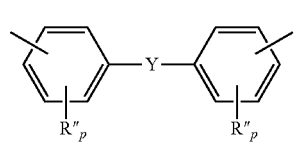

(S)

where (i) Y is selected from the group consisting of alkylenes of 1 to 6 carbon atoms, in particular —C(CH$_3$)$_2$; (ii) R'' is independently selected from the group consisting of hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and (iii) p is independently 0, 1, 2, 3 or 4; provided that at least one of Ar, Ar''' and R comprise at least one ether group wherein said ether group is present in the polymer chain backbone.

In a preferred embodiment, at least 50 mol % of the recurring units ($R_{PEI}$) are recurring units selected from the group consisting of those of formula (T) in imide form, their corresponding amic acid forms of formulae (T'-A) and (T'-B), and mixtures thereof:

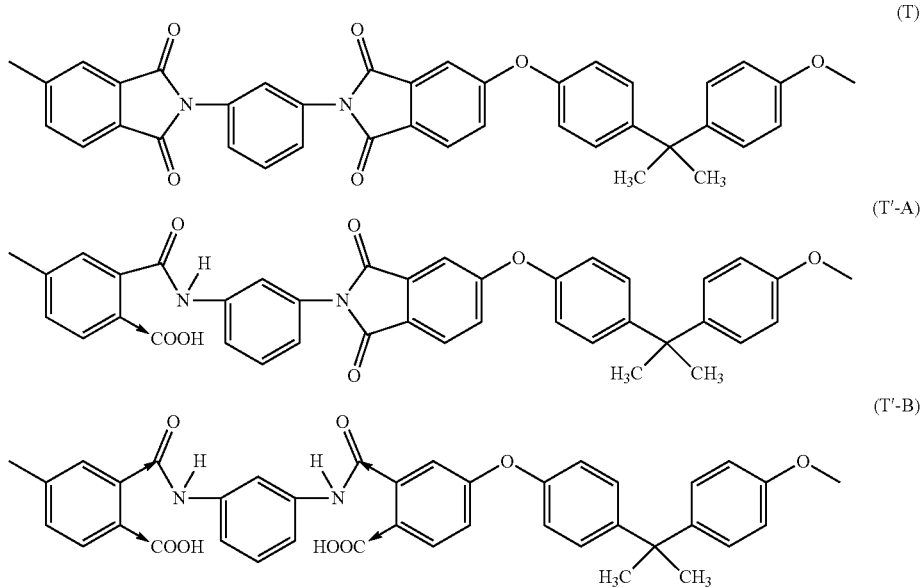

(T)

(T'-A)

(T'-B)

where in formulae (T'-A) and (T'-B) the "→" denotes isomerism so that in any recurring unit the groups to which the arrows point may exist as shown or in an interchanged position.

In a another preferred embodiment, at least 50 mol % of the recurring units ($R_{PEI}$) are recurring units selected from the group consisting of those of formula (U) in imide form, their corresponding auric acid forms of formulae (U'-A) and (U'-B), and mixtures thereof:

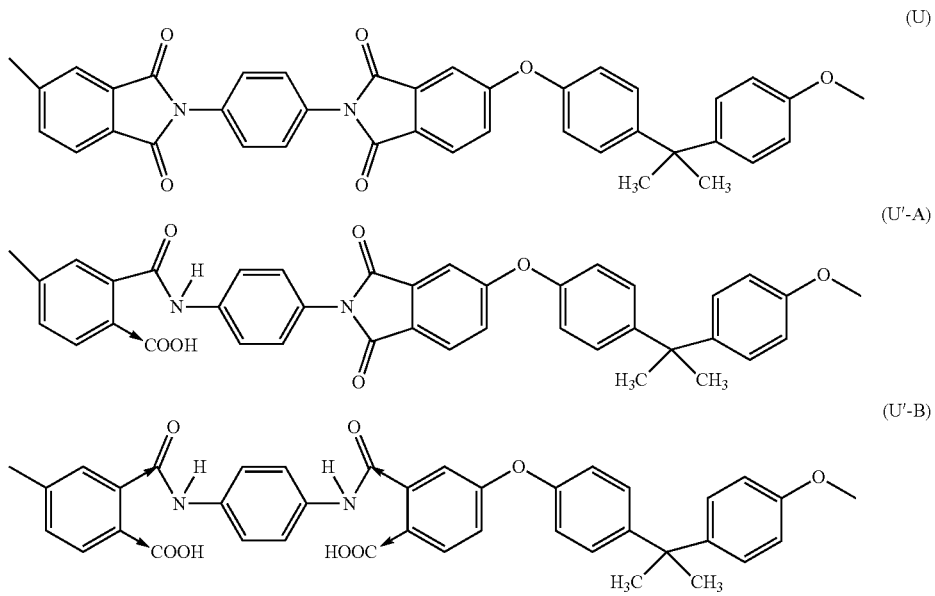

(U)

(U'-A)

(U'-B)

wherein in formulae (U'-A) and (U'-B) the "→" denotes isomerism so that in any recurring unit the groups to which the arrows point may exist as shown or in an interchanged position.

Preferably at least 60 mol %, 70 mol %, 80 mol %, 90 mol %, 95 mol %, 99 mol %, and most preferably all of recurring units ($R_{PEI}$) are selected from the group consisting of those of formulae (T), (T'-A), (T'-B), and mixtures thereof or (U), (U'-A), (U'-B), and mixtures thereof.

The Alkali Metal Carbonate

The polymer composition includes at least one alkali metal carbonate in an amount ranging from about 0.05 to about 2 wt. %, about 0.1 to about 1.8 wt. %, about 0.1 to about 1.6 wt. %, about 0.1 to about 1.5 wt. %, about 0.1 to about 1.3 wt. %, about 0.1 to about 1.0 wt. %, about 0.1 to about 0.8 wt. %, about 0.1 to about 0.5 wt. % based on the total weight of polymers in the polymer composition. In some embodiments, the amount of alkali metal carbonate ranges from about 0.1 to about 0.5 wt. %, about 0.2 to about 0.5 wt. %, about 0.4 to about 0.5 wt. % based on the total weight of polymers in the polymer composition. In some embodiments, the amount of alkali metal carbonate is less than or equal to 1.0 wt. %, 0.9 wt. %, 0.8 wt. %, 0.7 wt. %, 0.6 wt. %, 0.5 wt. %, 0.4 wt. %, 0.3 wt. %, 0.2 wt. %, 0.1 wt. % based on the total weight of polymers in the polymer composition.

The alkali metal carbonate may be selected from the group consisting of sodium carbonate, potassium carbonate, cesium carbonate and lithium carbonate. Potassium and sodium carbonates are preferred. Mixtures of two or more alkali metal carbonates may be used.

In some aspects, the particle size D50 (median diameter or the medium value of the particle size distribution) ranges from 2 microns to 1000 microns, preferably from 2 to 500 microns, most preferably from 3 to 200 microns.

Optional Reinforcing Fillers

A large selection of reinforcing fillers may be added to the polymer composition. They are preferably selected from fibrous and particulate fillers. A fibrous reinforcing filler is considered herein to be a material having length, width and thickness, wherein the average length is substantially larger than both the width and thickness. Preferably, such a material has an aspect ratio, defined as the average ratio between the length and the smallest of the width and thickness of at least 5. Preferably, the aspect ratio of the reinforcing fibers is at least 10, more preferably at least 20, still more preferably at least 50. The particulate fillers have an aspect ratio of at most 5, preferably at most 2.

Preferably, the reinforcing filler is selected from mineral fillers, such as talc, mica, titanium dioxide, kaolin, calcium carbonate, calcium silicate, magnesium carbonate; glass fibers; carbon fibers, boron carbide fibers; wollastonite; silicon carbide fibers; boron fibers, graphene, carbon nanotubes (CNT), and the like.

The reinforcing filler may be present in the polymer composition in an amount of at least 5 wt. %, preferably at least 10 wt. %, more preferably at least 15 wt. %, based on the total weight of the polymer composition.

The reinforcing filler is also preferably present in an amount of at most 60 wt. %, more preferably at most 50 wt. %, still more preferably at most 40 wt. %, based on the total weight of the polymer composition.

Preferably, the amount of the reinforcing filler ranges from 0.1 wt. % to 60 wt. %, more preferably from 5 wt. % to 50 wt. %, still more preferably from 10 wt. % to 40 wt. % of the polymer composition. According to some embodiments, the polymer composition is free of a fibrous filler. Alternatively the polymer composition may be free of a particulate filler. Preferably, the polymer composition is free of reinforcing fillers.

Additional Optional Ingredients

In some aspects, the polymer composition consists or consists essentially of the at least two different polymers and the alkali metal carbonate; however, in other aspects, the polymer composition may include one or more additional additives.

The polymer composition may further optionally include other ingredients such as a colorant such as a dye and/or a pigment such as titanium dioxide, zinc sulfide, zinc oxide, ultraviolet light stabilizers, heat stabilizers, antioxidants such as organic phosphites and phosphonites, acid scavengers, processing aids, nucleating agents, lubricants, flame retardants, a smoke-suppressing agents, an anti-static agents, anti-blocking agents, and/or conductivity additives such as carbon black.

When one or more other ingredients are present, their total weight is preferably less than 20 wt. %, less than 10 wt. %, less than 5 wt. % and most preferably less than 2 wt. %, based on the total weight of polymer composition.

It has surprisingly been discovered that organic and inorganic acid components having a pKa<7.5, preferably <7, are able to stabilize the melt viscosity of the polymer composition of the invention. Non-limiting examples of organic and inorganic components having a pKa<7.5 are sodium hydrogen phosphate ($NaH_2PO_4$), monosodium citrate, sodium hydrogen oxalate, and sodium hydrogen phthalate. Inorganic components, such as, for example, $NaH_2PO_4$, having a pKa<7 are preferred. Excellent results were obtained with organic and inorganic components having a pKa as follows: 2.5<pKa<7.5, preferably 3<pKa<7. The organic or inorganic acid component having a pKa<7.5 may be present in an amount ranging from 0.05 wt. % to 5 wt. %, preferably from 0.1 wt. % to 2 wt. %, more preferably from 0.2 wt. % to 1 wt. %, based on the total weight of polymers in the polymer composition.

Exemplary Polymer Blends

The present polymer composition may include any polymer described herein in combination with one or more of any other polymer described herein. The polymers may be in their non-reactive or reactive forms.

According to an embodiment, the at least two different polymers comprise a poly(aryl ether ketone) (PAEK) and a poly(para-phenylene sulfide) (PPS), for example a polyetheretherketone (PEEK) and a poly(para-phenylene sulfide) (PPS).

According to another embodiment, the at least two different polymers comprise:
 a poly(aryl ether sulfone) (PAES) and
 a polyetheretherketone (PEEK) or a polyetherimide (PEI).

According to another embodiment, the at least two different polymers are selected in the group consisting of a polyethersulfone (PES), a polyphenylsulfone (PPSU) and a polysulfone (PSU).

For example, the polymer composition may include or be free of any polymers listed in Table 1 below.

Exemplary blends include:

TABLE 1

| Blend No. | Polymer (A) | Polymer (B) |
|---|---|---|
| 1 | PEEK | PEKK |
| 2 | PEEK | PEK |
| 3 | PEKK | PEK |
| 4 | PEEK | PPSU |
| 5 | PEEK | PSU |
| 6 | PEKK | PPSU |
| 7 | PEKK | PSU |
| 8 | PEK | PPSU |
| 9 | PEK | PSU |
| 10 | PPSU | PES |
| 11 | PPSU | PSU |
| 12 | PES | PSU |
| 13 | PEEK | PPS |
| 14 | PEKK | PPS |
| 15 | PEK | PPS |
| 16 | PEEK | PEI |
| 17 | PEKK | PEI |
| 18 | PEK | PEI |
| 19 | PPSU | PEI |
| 20 | PES | PEI |
| 21 | PSU | PEI |
| 22 | PPS | PEI |
| 23 | PEEK | PEEK-PEDEK |
| 24 | PEKK | PEEK-PEDEK |
| 25 | PEK | PEEK-PEDEK |
| 26 | PPSU | PEEK-PEDEK |
| 27 | PSU | PEEK-PEDEK |
| 28 | PPS | PEEK-PEDEK |
| 29 | PEI | PEEK-PEDEK |

Each blend in Table 1 above includes at least the polymer (A) and the polymer (B) listed, but may also include other polymers, preferably another polymer listed in Table 1, or a reactive polymer as described herein, and/or one or more additional ingredients. For example, the polymer composition may include a blend of PEI, PPSU, and PEEK, or in Blend No. 10, polymer (B) could include rPES instead of, or in addition to, PES.

The present polymer composition may include an amount of one of the at least two different polymers, for example polymer (A), of at least 1 wt. %, preferably at least 2 wt. %, 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, 95 wt. %, 98 wt. %, 99 wt. % of the total combined weight of polymers in the polymer composition. Most preferably, the polymer composition includes 80 wt. %, preferably 65 wt. %, more preferably 50 wt. % of one of the at least two different polymers (for example, polymer (A)) and 20 wt. %, preferably 35 wt. %, preferably 50 wt. %, respectively, of another of the at least two different polymers (for example, polymer (B)), based on the total weight of the polymers in the polymer composition.

Exemplary Properties of the Polymer Composition

The polymer compositions of the present invention may include a dispersed phase that is dispersed in a continuous phase or matrix. An example of a dispersed phase is shown in FIG. 1B.

In some embodiments, the average surface area per dispersed particle is preferably less than or equal to about 4 $\mu m^2$, about 3 $\mu m^2$, about 2 $\mu m^2$, about 1 $\mu m^2$.

In some embodiments, the maximum diameter of particles of the dispersed phase is ≤3 µm, preferably ≤2 µm, ≤1 µm, ≤0.8 µm, ≤0.6 µm, ≤0.4 µm, most preferably ≤0.1 µm.

In some embodiments, the polymer blends may include co-continuous phases characterized by the presence of continuous ribbons of the polymer components when viewed by transmission electron microscopy (TEM). An example of a co-continuous phase is shown in FIG. 1A. In such embodiments, the average width of the ribbons is preferably less than or equal to about 3 µm, more preferably less than or equal to about 2 µm, where the average width is calculated by taking 10 random measurements of the ribbon width, discarding the longest and shortest measurements, and dividing the sum of the remaining measurements by 8.

In some embodiments, the polymer composition of the invention, preferably a polymer composition including PEEK and PPS, exhibits a Dynatup Impact total energy according to ASTM D3763 ranging from 40 to 60 ft-lbs.

In some aspects, the polymer composition of the invention, preferably a polymer composition including PEEK and PPS, exhibits a tensile strength ranging from 12000 to 15000 psi and/or a tensile elongation at break ranging from 4.8 to 5% after aging in an oven at 200° C. for 2000 hours.

The polymer composition may exhibit at least two different glass transition temperatures (Tg) corresponding to each of the at least two different polymers; however, these Tgs may be different (i.e. shifted) as compared with the Tgs of the same polymers when not in the polymer composition. In some embodiments, the difference between the respective Tgs in the polymer composition (the ΔTg) is at least 0.5° C., preferably at least 1° C., more preferably from 5 to 50° C., even more preferably from 5 to 10° C.

Method of Making the Polymer Composition

In some embodiments, the invention includes a method of making the polymer compositions described herein by melt mixing the at least two different polymers, about 0.05 to about 2 wt. % of at least one alkali metal carbonate, and optionally the acid component. Preferably, the polymer composition is free or substantially free of solvent.

The at least two different polymers may be independently selected from a poly(aryl ether ketone) (PAEK), a poly(aryl ether sulfone) (PAES), a polyarylene sulfide (PAS) and a polyetherimide (PEI), as described above.

The components of the mixture may be added or mixed in any order, in any amount or fraction their total amount, and may be mixed separately or simultaneously.

The preparation of the polymer composition can be carried out by any known melt-mixing process that is suitable for preparing thermoplastic molding compositions. Such a process may be carried out by heating the polymers above the melting temperature of the semi-crystalline polymers to form a melt of the polymers and/or above the Tg of the amorphous polymers. In some embodiments, the processing temperature ranges from about 250-450° C., preferably from about 280-420° C. Preferably, the processing temperature is at least 15° C., preferably at least 50° C., preferably at least 100° C. greater than the glass transition temperature (Tg) of the highest Tg polymer in the polymer composition and/or at least 15° C. greater than the melting temperature (Tm) of the highest Tm polymer in the polymer composition.

In the some aspects of the process for the preparation of the polymer composition, the components for forming the polymer composition are fed to the melt-mixing apparatus and melt-mixed in that apparatus. Suitable melt-mixing apparatuses are, for example, kneaders, Banbury mixers, single-screw extruders, and twin-screw extruders. Preferably, use is made of an extruder fitted with means for dosing the desired components to the extruder, either to the extruder's throat or to the melt. Preferably the extruder is equipped with one or more ports allowing dosing to the melt at different barrels during the extrusion process.

The components may be fed simultaneously as a powder mixture or granule mixture, also known as dry-blend, or may be fed separately. Preferably, the ratio of the viscosity of one of the at least two different polymers to the viscosity of another of the at least two different polymers ranges from 0.1 to 10, more preferably from 0.5 to 5, most preferably from 0.8 to 2, measured at the processing temperature.

In some embodiments, the at least two polymers and the alkali metal carbonate are added to the throat of the extruder, preferably simultaneously or substantially simultaneously. In other aspects, one of the at least two different polymers may be added with the alkali metal carbonate to the throat of the extruder, and another of the at least two different polymers is subsequently added to the melt at a barrel of the extruder. When added, the acid component may be added at the throat of the extruder, or to the melt at any barrel of the extruder. Preferably, the acid component is added to the melt at a downstream barrel such that it contacts the melt shortly before the melt is extruded. Preferably, the acid component is added at a time after the addition of the alkali metal carbonate.

In exemplary embodiments, multiple-pass extrusion may be performed. In multiple-pass extrusion, extrudate from a first pass is reintroduced into the extruder, preferably at the throat, such that it passes through the extruder a second time. In multiple-pass extrusion, two, three, four, or more passes may be performed, and the polymer, alkali metal carbonate, optional acid component, or other ingredients may be added at any point on the extruder line in any pass. For example, one of the at least two different polymers may be added to the throat of the extruder with the alkali metal carbonate. The extrudate from a first pass may then be recycled to the extruder with addition of another of the at least two different polymers. Optionally, the acid component can be added toward the end of the second pass, or the extrudate resulting from the second pass may be recycled for a third pass during which, for example, an acid component and/or filler material may be added to the melt prior to extrusion into a final product.

In some aspects, at least two passes may be performed, and components maybe be added to the extrudate and/or a process performed (for example, mixing) on the extrudate before it is recycled to the extruder for one or more additional passes.

The extruder may be operated at any suitable speed. The extruder speed and the temperatures of the extruder barrels may be constant or varied. Preferably the extruder screw(s) are rotated at about 100 to about 900, preferably from about 200 to about 500 rpm; however, speed and temperature may be adjusted based on the particular polymer composition being blended.

The "total residence time" as used herein means the total time that the longest-residing component spends in the extruder, including multiple passes, if any. The total residence time preferably ranges from about 15 seconds to about 4 minutes, preferably from about 30 seconds to about 2 minutes.

The polymer compositions described herein are advantageously provided in the form of pellets, which may be used in injection molding or extrusion processes known in the art.

Accordingly, in some embodiments, the method includes (i) contacting the at least two different polymers and the alkali metal carbonate to form a first initial mixture; (ii) contacting one of the at least two different polymers and the alkali metal carbonate to form a second initial mixture and subsequently contacting the second initial mixture with another of the at least two different polymers; or (iii) contacting the at least two different polymers to form a third initial mixture and subsequently contacting the third initial mixture with the alkali metal carbonate.

In some aspects the method further includes contacting the first initial mixture, the second initial mixture, or the third initial mixture with an acid component as described above.

In some embodiments, the method includes extruding the polymer composition. For example, (i) the second initial mixture may be extruded prior to contact with the another of the at least two different polymers, (ii) the third initial mixture may be extruded prior to contact with the alkali metal carbonate, or (iii) the first initial mixture, second initial mixture, or third initial mixture may be extruded prior to contact with the acid component.

Shaped Articles Including the Polymer Composition

Exemplary embodiments also include articles comprising the above-described polymer composition.

The articles may be made from the polymer composition using any suitable melt-processing method. In particular, they may be made by injection molding, extrusion molding, roto-molding, or blow-molding.

The polymer composition may be well suited for the manufacture of articles useful in a wide variety of end uses.

The invention will be herein after illustrated in greater detail in the following section by means of non-limiting examples.

Should the disclosure of any patents, patent applications, and publications which are incorporated herein by reference conflict with the description of the present application to the extent that it may render a term unclear, the present description shall take precedence.

EXAMPLES

Example 1

Example 1: Blend PEEK/PPS/$K_2CO_3$ 50/50/0.5 wt % with 3 min residence time.

Comparative Example 1: Blend PEEK/PPS 50/50 wt % with 5 min residence time.

Materials:
  Poly(ether ether ketone) (PEEK) Ketaspire® KT-880 from Solvay Specialty Polymers U.S.A, L.L.C.
  Poly(para-phenylene sulfide) (PPS) T-4G from DIC
  Potassium carbonate, $K_2CO_3$ UNID EF-80, dried at 140° C. under vacuum before use.

Compounding:
  The blends were compounded in a DSM Xplore® twin-screw (100 rpm) extruder heated at 390° C. and equipped with a recirculation loop allowing control of residence time. The materials (total of 10 g) were introduced simultaneously and mixed for a time (residence time) before being extruded into a strand.

Measurements:
  The torque needed to rotate the extruder screws was measured during blending. The torque correlates with the viscosity of the molten blend with a higher force indicating a higher viscosity.

The level of die swell was observed at the exit of the extruder and ranked as follows: −−very large die swell, −some die swell, +limited die swell, ++no die swell.

The thermal properties, i.e., melting temperature and crystallization temperature of PEEK and PPS were determined by DSC at a heating rate of 20° C./min.

The morphology of the blend was analyzed by Scanning Electron Microscopy (SEM) and Transmission Electron Microscopy (TEM) to give a maximum diameter of the dispersed phase Results:
  The polymer compositions and measurements are shown below in Table 2. The morphology of the blends is shown in the Transmission Electron Microscopy (TEM) scans of FIG. 1.

TABLE 2

|  | C1 | E1 |
|---|---|---|
| PEEK (parts) | 50 | 50 |
| PPS (parts) | 50 | 50 |
| $K_2CO_3$ (parts) | — | 0.5 |
| Residence time (min) | 5 | 3 |
| Initial force (N) | 970 | 1,113 |
| Final force (N) | 1,183 | 1,470 |
| Die swell | −− | — |
| Tc (° C.)—PPS | 224 | 214 |
| Tc (° C.)—PEEK | 292 | 265 |
| Tm (° C.)—PPS | 276 | 275 |
| Tm (° C.)—PEEK | 341 | 339 |
| Morphology (max diameter) | Co-continuous, 10 μm | 2 μm |

PEEK and PPS were clearly immiscible (co-continuous morphology having a very large size of about 10 μm) and exhibited a very large die swell at the exit of the extruder (Comparative Example 1). The introduction of only 0.5% of $K_2CO_3$ unexpectedly compatibilized PEEK and PPS as shown with the small domain size of about 2 μm at the maximum and reduced die swell (Example 1 and FIG. 1B).

Example 2

Example 2: Blend PEI/PES/K₂CO₃ 50/50/0.5 wt % with 2 min residence time.
Comparative Example 1: Blend PEI/PES 50/50 wt % with 2 min residence time.

Materials:
Polyetherimide (PEI) Ultem®1010 from Sabic
Polyethersulfone (PES) Veradel®3600P from Solvay Specialty Polymers U.S.A, L.L.C.
Potassium carbonate as described in Example 1.

Compounding and Measurements

The blends were compounded as described in Example 1, except that the extruder was heated at 380° C. Measurements of viscosity, die swell, and morphology were taken as described in Example 1.

Figure 2:
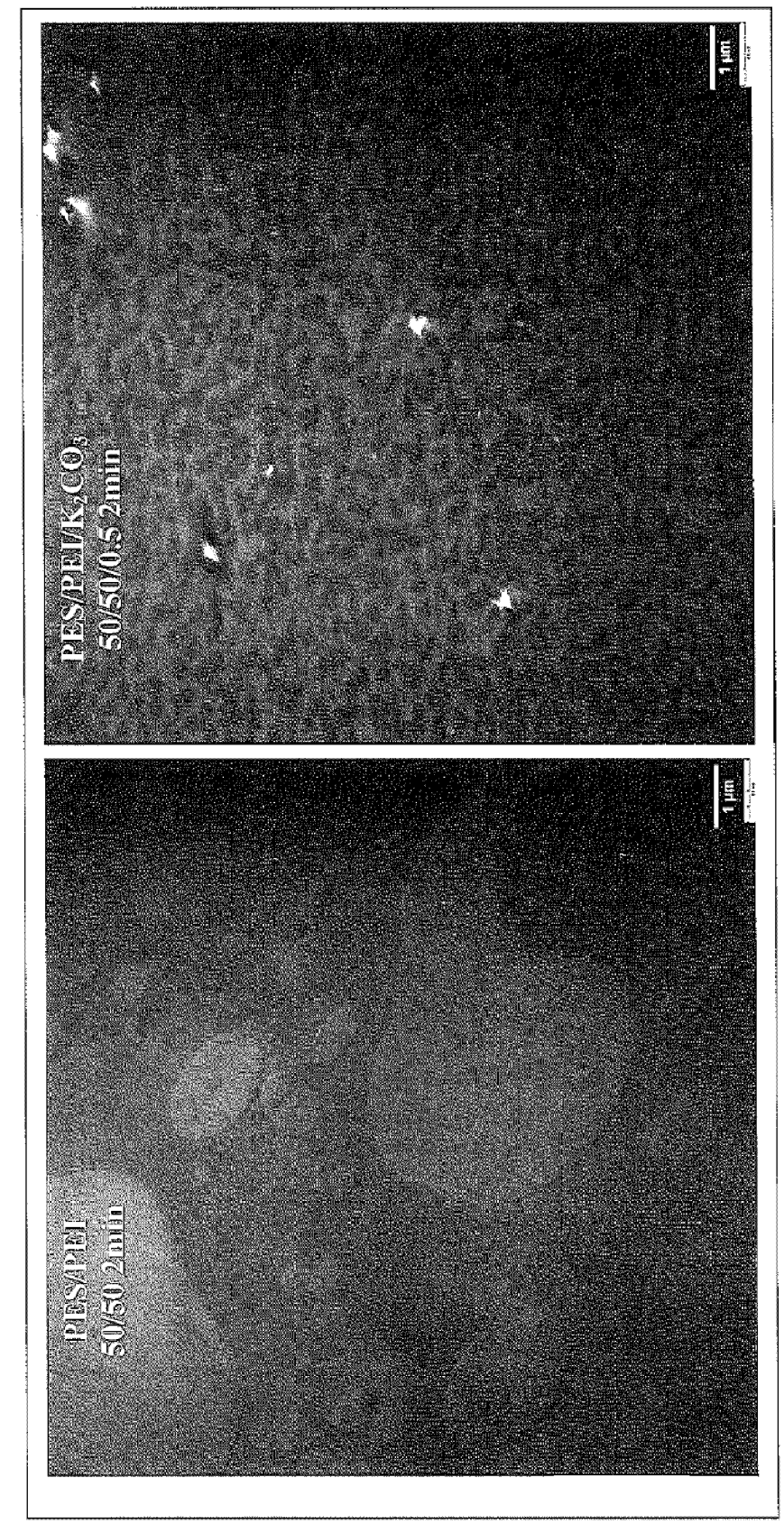
FIG. 2 shows TEM scans of the compositions of Comparative Example 2 (FIG. 2A) and Example 2 (FIG. 2B).

Results:

The polymer compositions and measurements are shown below in Table 3. The morphology of the blends is shown in the Transmission Electron Microscopy (TEM) scans of FIG. 2.

TABLE 3

|  | C2 | E2 |
|---|---|---|
| PEI (parts) | 50 | 50 |
| PES (parts) | 50 | 50 |
| K₂CO₃ (parts) | — | 0.5 |
| Residence time (min) | 2 | 2 |
| Initial force (N) | 1,145 | 2,465 |
| Final force (N) | 1,470 | 3,443 |
| Die swell | — | ++ |
| Morphology (max diameter) | 10 μm | 0.5 μm |

PEI and PES were found to be immiscible (dispersed phase having a very large diameter of about 10 μm) and exhibited a large die swell at the exit of the extruder (Comparative Example 2). The introduction of only 0.5% of K₂CO₃ unexpectedly compatibilized PEI and PES as shown by the small domain size of about 0.5 μm and no die swell) (Example 2 and FIG. 2B).

Examples 3-5

Examples 3 to 5: Blends of PEEK/PPS/K₂CO₃.
Comparative Example 3: Blend of PEEK/PPS 65/35 wt %

Materials:
PEEK: Ketaspire® KT-880 from Solvay Specialty Polymers USA, LLC.
PPS: QA-200 from Solvay Specialty Polymers USA, LLC.
K₂CO₃: LH-90 from Howard Industries, Inc.

Compounding:

The polymer compositions of Table 4 were melt compounded using a 26 mm diameter Coperion® ZSK-26 co-rotating partially intermeshing twin screw extruder having an L/D ratio of 48:1. The barrel sections 2 through 12 and the die were heated to set point temperatures as follows:
Barrels 2-6: 360° C.
Barrels 7-12: 350° C.
Die: 360° C.

In each case, the resins and additives were fed at barrel section 1 and at barrel section 5 using gravimetric feeders at throughput rates in the range 30-40 lb/hr. The extruder was operated at screw speeds of around 200 RPM. Vacuum was applied at barrel zone 10 with a vacuum level of about 27 inches of mercury. A single-hole die was used for all the compounds and the molten polymer strand exiting the die was cooled in a water trough and then cut in a pelletizer to form pellets approximately 3.0 mm in length by 2.7 mm in diameter.

Injection Molding:

Injection molding was performed on the example formulations to produce 3.2 mm (0.125 in) thick ASTM tensile and flexural specimens and 4×4×0.125 in plaques for mechanical property testing. Type I tensile ASTM specimens and 4×4×0.125 in. plaques were injection molded using the following approximate temperature conditions on the barrel and mold:
Rear zone: 680° F.
Middle zone: 680° F.
Front zone: 700° F.
Nozzle: 700° F.
Mold: 285° F.

Heat Aging:

Type I tensile ASTM specimens were heat-aged in an oven at 200° C. for up to 2000 hours. Ten specimens of each polymer composition were pulled every 500 hours, conditioned 24 hours at 23° C./50% RH for at least 24 hours before testing.

Testing:

Mechanical properties were tested for all the formulations using injection molded 0.125 inch thick ASTM test specimens which consisted of 1) Type I tensile bars, and 2) 4 in×4 in×0.125 in plaques for the instrumented impact (Dynatup) testing. The following ASTM test methods were employed in evaluating all polymer compositions:
D-638: Tensile properties: tensile strength at break, tensile modulus and tensile elongation at break
D-3763: High Speed Puncture Multiaxial Impact (Dynatup Impact)

Results:

The high speed puncture multiaxial impact (Dynatup Impact) data and tensile properties after heat aging are shown below in Table 4:

TABLE 4

|  | C3 | E3 | E4 | E5 |
|---|---|---|---|---|
| PEEK (parts) | 65 | 65 | 65 | 65 |
| PPS (parts) | 35 | 34.9125 | 34.825 | 34.65 |
| K₂CO₃ (parts) | — | 0.0875 | 0.175 | 0.35 |
| D-3763—Total Energy (ft-lbs) | 3.8 | 57.5 | 45.7 | 55.1 |
| Tensile Strength (psi) | 14700 | 13800 | 14100 | 14300 |
| Tensile Elongation at break | 12 | 14 | 15 | 20 |
| After 500 hours at 200° C. | | | | |
| Tensile Strength (psi) | 15500 | 14900 | 15000 | 15300 |
| Tensile Elongation at break | 4.6 | 14 | 13 | 19.3 |
| After 1000 hours at 200° C. | | | | |
| Tensile Strength (psi) | 11500 | 14900 | 15200 | 15200 |
| Tensile Elongation at break | 2.2 | 15 | 13 | 6.3 |
| After 1500 hours at 200° C. | | | | |
| Tensile Strength (psi) | 8800 | 14900 | 15400 | 15100 |
| Tensile Elongation at break | 1.5 | 5.3 | 5.8 | 5.7 |
| After 2000 hours at 200° C. | | | | |
| Tensile Strength (psi) | 5460 | 12900 | 14000 | 14500 |
| Tensile Elongation at break | 1.6 | 4.8 | 5 | 4.9 |

Figure 3:
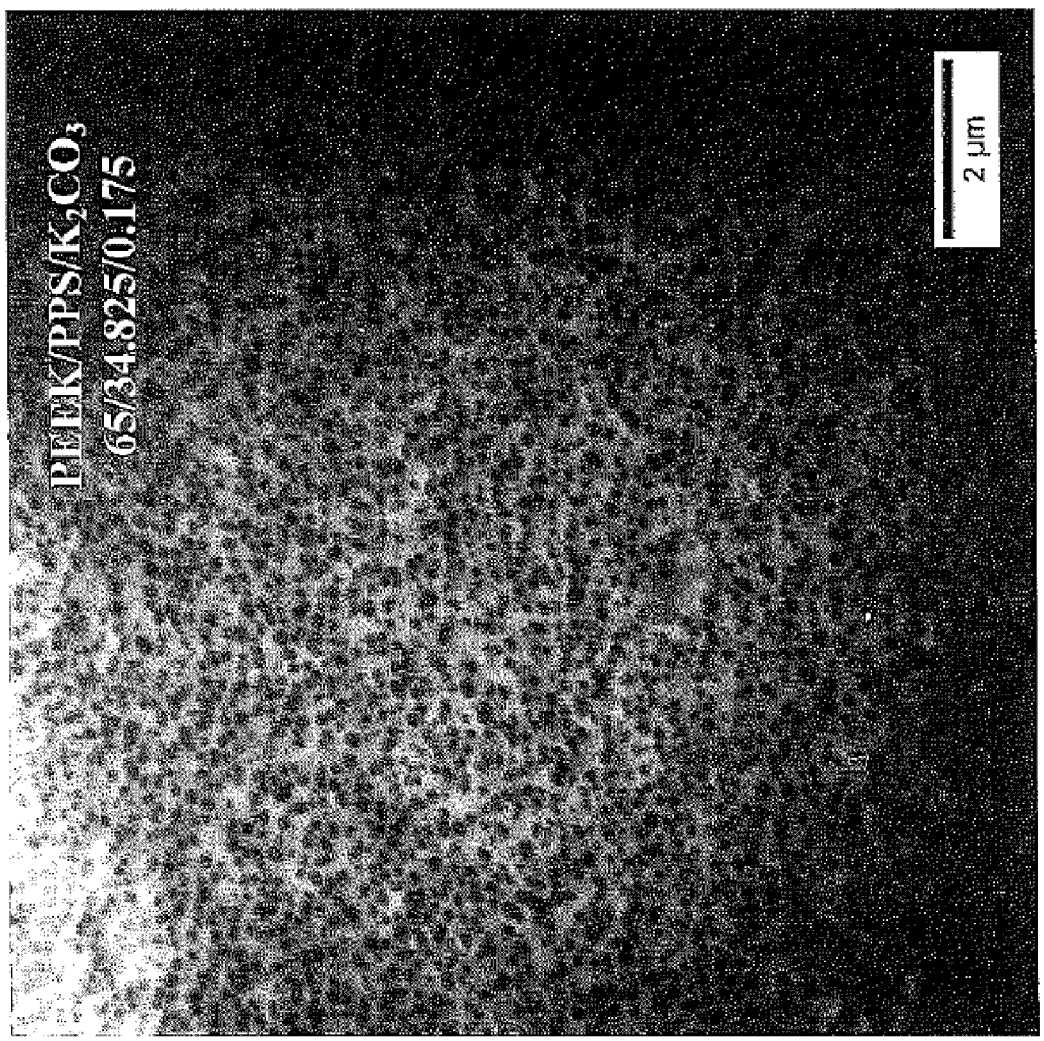
FIG. 3 is a TEM scan of the composition of Example 4.

As shown in Table 4, the introduction of K₂CO₃ unexpectedly enhanced both the impact properties and the long-term heat aging resistance of blends of PEEK with PPS. The presence of K₂CO₃ allows the generation of very small PPS domains of sizes of less than 0.3 μm that are homogeneously dispersed in PEEK (Example 4 and FIG. 3).

Should the disclosure of any patents, patent applications, and publications which are incorporated herein by reference conflict with the description of the present application to the extent that it may render a term unclear, the present description shall take precedence.

The invention claimed is:

1. A polymer composition comprising:
   i) at least two different polymers independently selected from the group consisting of a poly(aryl ether ketone) (PAEK), a poly(aryl ether sulfone) (PAES), a polyarylene sulfide (PAS), and a polyetherimide (PEI), wherein the polymer composition is free of a combination of a poly(para-phenylene sulfide) (PPS) and a poly(aryl ether sulfone) (PAES); and
   ii) from about 0.05 to about 2 wt. % of at least one alkali metal carbonate selected from the group consisting of sodium carbonate, potassium carbonate and combinations thereof, based on the total weight of polymers in the polymer composition,
   wherein the amount of one of the at least two different polymers is 50 to 80% and the amount of the other one of the at least two different polymers is 20 to 50% based on the total weight of the polymers in the polymer composition.

2. The polymer composition of claim 1, wherein the polymer composition does not comprise solvent(s) or comprises solvent(s) in an amount not exceeding 2 wt. %, based on the total weight of the composition.

3. The polymer composition of claim 1, wherein the polymer composition does not have a combination of
   a poly(aryl ether ketone) (PAEK) and a poly(ether sulfone) (PES).

4. The polymer composition of claim 1 further comprising an acid component having a pKa≤7.5.

5. The polymer composition of claim 1, wherein the poly(aryl ether ketone) (PAEK) is selected from the group consisting of a poly(ether ether ketone) (PEEK), a poly(ether ketone ketone) (PEKK), a poly(ether ketone) (PEK), a PEEK-poly(diphenyl ether ketone) copolymer (PEEK-PEDEK copolymer), and combinations thereof.

6. The polymer composition of claim 1, wherein the poly(aryl ether sulfone) (PAES) is selected from the group consisting of a polysulfone (PSU), a polyethersulfone (PES), and a polyphenylsulfone (PPSU).

7. The polymer composition of claim 1, wherein the polyarylene sulfide (PAS) is a poly(para-phenylene sulfide) (PPS).

8. The polymer composition of claim 1, wherein at least one of the at least two different polymers is a polyetherimide (PEI).

9. The polymer composition of claim 1, wherein the at least two different polymers comprise a poly(aryl ether ketone) (PAEK) and a poly(para-phenylene sulfide) (PPS).

10. The polymer composition of claim 1, wherein the at least two different polymers comprise:
    a poly(aryl ether sulfone) (PAES); and
    a polyetheretherketone (PEEK) or a polyetherimide (PEI).

11. The polymer composition of claim 1, wherein the at least two different polymers are selected in the group consisting of a polyethersulfone (PES), a polyphenylsulfone (PPSU), and a polysulfone (PSU).

12. A method of making a polymer composition comprising melt mixing:
    i) at least two different polymers independently selected from the group consisting of a poly(aryl ether ketone) (PAEK), a poly(aryl ether sulfone) (PAES), a polyarylene sulfide (PAS) and a polyetherimide (PEI), wherein the polymer composition is free of a combination of a poly(para-phenylene sulfide) (PPS) and a poly(aryl ether sulfone) (PAES); and
    ii) from about 0.05 to about 2 wt. % of at least one alkali metal carbonate selected from the group consisting of sodium carbonate, potassium carbonate and combinations thereof, based on the total weight of polymers in the polymer composition,
    wherein the amount of one of the at least two different polymers is 50 to 80% and the amount of the other one of the at least two different polymers is 20 to 50% based on the total weight of the polymers in the polymer composition.

13. The method of claim 12, wherein the method further comprises:
    (a1) contacting the at least two different polymers and the alkali metal carbonate to form a first initial mixture;
    (a2) contacting one of the at least two different polymers and the alkali metal carbonate to form a second initial mixture and subsequently contacting the second initial mixture with another of the at least two different polymers; or
    (a3) contacting the at least two different polymers to form a third initial mixture and subsequently contacting the third initial mixture with the alkali metal carbonate; and
    (b} optionally contacting the first initial mixture, the second initial mixture, or the third initial mixture with an acid component having a pKa≤7.5.

14. The method of claim 12, further comprising
    (c) extruding the polymer composition,
    wherein:
    the second initial mixture is extruded prior to contact with the another of the at least two different polymers,
    the third initial mixture is extruded prior to contact with the alkali metal carbonate, or
    the first initial mixture, second initial mixture, or third initial mixture are extruded prior to contact with the acid component.

15. A polymer composition made by the method of claim 12.

16. A shaped article comprising the polymer composition of claim 1.

17. The polymer composition of claim 1, wherein the at least two different polymers comprise a polyetheretherketone (PEEK} and a poly(para-phenylene sulfide) (PPS).

* * * * *